(12) United States Patent
Surdu

(10) Patent No.: US 10,417,423 B2
(45) Date of Patent: Sep. 17, 2019

(54) TWINBOARD MOBILE COMPUTING SYSTEM

(71) Applicant: Oleksii Surdu, Broadlands, VA (US)

(72) Inventor: Oleksii Surdu, Broadlands, VA (US)

(73) Assignee: GBS Laboratories, LLC, Herndon, VA (US)

( * ) Notice: Subject to any disclaimer, the term of this patent is extended or adjusted under 35 U.S.C. 154(b) by 101 days.

(21) Appl. No.: 15/783,477

(22) Filed: Oct. 13, 2017

(65) Prior Publication Data

US 2019/0114425 A1  Apr. 18, 2019

(51) Int. Cl.
*G06F 21/00* (2013.01)
*G06F 21/56* (2013.01)
*G06F 13/20* (2006.01)

(52) U.S. Cl.
CPC ............ *G06F 21/567* (2013.01); *G06F 13/20* (2013.01); *G06F 2221/034* (2013.01)

(58) Field of Classification Search
CPC ... G06F 21/567; G06F 13/20; G06F 2221/034
See application file for complete search history.

(56) References Cited

U.S. PATENT DOCUMENTS

| | | | | |
|---|---|---|---|---|
| 5,557,363 A * | 9/1996 | Kunishige | ............... | G03B 7/081 396/125 |
| 7,356,677 B1 * | 4/2008 | Rafizadeh | ............. | G06F 9/4418 713/1 |
| 9,003,080 B2 * | 4/2015 | Bachrany | .................. | G06F 3/00 710/37 |
| 10,253,804 B2 * | 4/2019 | Park | ........................ | F16C 11/04 |
| 2003/0097511 A1 * | 5/2003 | Choi | .................. | G05B 19/0423 710/305 |
| 2008/0320118 A1 * | 12/2008 | Uchida | ................. | G06F 9/5061 709/221 |
| 2010/0325405 A1 * | 12/2010 | Laue | ...................... | G06F 9/441 713/2 |
| 2014/0129739 A1 | 5/2014 | King | | |
| 2015/0067672 A1 * | 3/2015 | Mitra | .................. | G06F 9/45533 718/1 |
| 2018/0032733 A1 | 2/2018 | Surdu | | |

* cited by examiner

*Primary Examiner* — Beemnet W Dada
(74) *Attorney, Agent, or Firm* — Capitol City TechLaw, PLLC; Jasbir Singh

(57) ABSTRACT

The invention comprises a mobile device with two circuit boards and certain shared resources, in order to provide the security of physically separate devices, yet do so in a single device using shared resources that do not affect security. Specifically, the invention has two boards connected via input/output switch, each having its own System-on-a-Chip (SoC), Memory (RAM), Storage and Radio Module (SIM(s)/Bluetooth/Wi-Fi), and may include one or more SIM cards. Touchscreen, battery, physical buttons and other peripherals are shared between boards. Each shared peripheral hardware module will be used by a single board only (the active in-use board being the "Foreground Board"); another board (the inactive "Background Board") uses an emulated version of the same hardware module. At any moment, a user can switch between Boards and the Background Board becomes the active Foreground Board and vice versa.

13 Claims, 11 Drawing Sheets

TWINBOARD MOBILE COMPUTING SYSTEM

FIELD OF THE INVENTION

The present invention generally relates to providing multiple computing environments or, in other words, security domains, in a single physical mobile device, and providing hardware-level isolation and protection from accessing one such internal computing environment from another, thus protecting an OS from malware that may be introduced in another OS of the same device.

BACKGROUND OF THE INVENTION

The growing number of cyber threats and intensive usage of mobile devices in business operations creates a huge demand in practical and reliable security solutions for the mobile market. Mobile devices have been accepted for business use by every industry in one way or another. Current mobile security solutions rely on OS security features and have been proven vulnerable to cross-environment cyber risks. While hardware virtualization solutions, especially Type-1 bare-metal hypervisor technology, offer better security than pure software methods like containers, Type-2 hypervisors, and standard antivirus, Intrusion Detection Systems, among others, the Type-1 bare-metal hypervisor technology generally suffers from power consumption and performance problems, due largely to parallel execution. Also, such hardware virtualization does not offer the true physical hardware separation of the execution environments, and furthermore, a simple code mistake in the hypervisor can lead to complete system compromise.

One of the possible solutions to such risks is to simply use multiple, separate mobile devices where each device is dedicated or even locked to perform only a specific function or access and employ a restricted network or trusted user group. Despite the obvious security advantages of this approach it creates several practical, usability and management problems. The cost of, and carrying, charging and using, two (or more) devices is not convenient, and has not gained widespread acceptance in the marketplace, practical issues compounded by the fact that most users employ at least a cell phone or tablet, notepad or similar mobile device.

The present invention offers an innovative approach to these problems. Dedicated hardware such as multiple mobile devices combined into a single unit with shared touchscreen and battery provides physical hardware-isolation for security and differences in functionality, and the usability of multiple devices without accompanying power, cost and convenience problems. This especially eliminates need for enterprise management of personal apps and personal activity. The proposed architecture is furthermore optimized for use on mobile devices having limited computing and power resources.

RELATED ART

The following references identify related art:

[1] Surdu, "Multiple Hardware-Separated Computer Operating Systems within a Single Processor Computer System to Prevent Cross-Contamination between Systems", patent Ser. No. 15/070,259, Filing Date: Mar. 15, 2016. [1] describes an invention with multiple OS running on a single processor computing system with the one OS active at a time only. This invention uses a lightweight, small and verifiable switching mechanism without the overhead of full system virtualization, with its own hardware environment separate from the OS kernel and user spaces of the various OS's, to control the dispatching and separation mechanisms of the various OS's. [1] is very efficient in terms of CPU and battery power usage, but it has usability limitations which are solved in the present invention.

[2] Surdu, "Mobile device virtualization solution based on bare-metal hypervisor with optimal resource usage and power consumption", patent Ser. No. 15/430,654, Filing Date: Feb. 13, 2017. [2] describes an invention with multiple secure virtualized environments operating in parallel with optimal resource usage, power consumption and performance. This is based on a special type of bare-metal hypervisor (Type-1) whereby virtual machines (VMs) have direct access to the computing system's hardware without adding traditional virtualization layers while the hypervisor maintains hardware-enforced isolation between VMs to prevent risk of cross-contamination. While [2] is very efficient in terms of isolating execution environments the present invention provides even stronger hardware isolation by integrating two separate physical boards with their own SoC, memory and radio interfaces into a single mobile device.

[3] King Richard, "Dual Mobile Device Apparatus", Pub. No.: US 2014/0129739 A1, Filing Date: May 8, 2014. [3] describes a dual mobile device apparatus comprising two mobile devices being mechanically coupled together. Both mobile devices are running their own operating systems. However, [3] duplicates all hardware including touchscreens, controls, cases, battery and includes a means for controlled communications between the first and second mobile devices. Thus, it is a heavier product with higher cost than the present invention.

DETAILED DESCRIPTION

Preferred embodiments of the present invention describe a mobile computing system comprising two separate boards connected via input/output switch (I/O switch). The boards use both dedicated (SoC, Memory, Storage, Radio) and shared (touchscreen, battery/power source, physical buttons, optional extended storage) hardware. Shared hardware can be used by a single board only (Foreground Board); and a separate board (Background Board) uses emulated peripherals. Switching between real and emulated, shared hardware modules is initiated by the user, is performed in I/O switch, and is transparent for Boards. Embodiments of the present invention do not require any modification to the mobile OS or applications.

In contrast to the prior art referenced as [1] and [2], preferred embodiments of the present invention use two boards to run OS's and do not share main hardware components such as CPU, memory, main storage, or radio module. The OS's on both Boards can run at the same time fully isolated from each other at the hardware level.

In the other referenced inventions, such as [1], a lightweight, small and verifiable switching mechanism without the overhead of full system virtualization is described. In [1] only a single OS is active at any given time and all OS's run on the same physical hardware. The approach of [2] presents a special type of Type-1 bare-metal hypervisor adapted for mobile devices, where all virtual machines run on the same physical hardware as in [1]. In contrast to [1], preferred embodiments of [2] allow parallel execution of the OS's in different virtual machines.

The prior art referenced as [3] describes a different approach compared to [1] and [2]. Two fully functional mobile devices are mechanically connected. While this approach provides a strong isolation, it has a usability, weight and cost limitations. Two touchscreens, batteries, cases and controls increase the cost and weight of a device, which are undesirable given the preference for continually smaller, lighter and less costly mobile devices.

As will be apparent to one having ordinary skill in the art, the present invention provides a secure and efficient architecture for what in effect is a true "2-in-1" mobile device. Unlike inventions referenced above, it combines security benefits of separate and dedicated hardware Boards each having certain critical components (CPU/memory/storage/radio), while at the same time providing the efficiency and usability of other components (touchscreen, buttons, battery and casing) which do not lessen the security benefits provided by the separate Boards.

Figure 1:
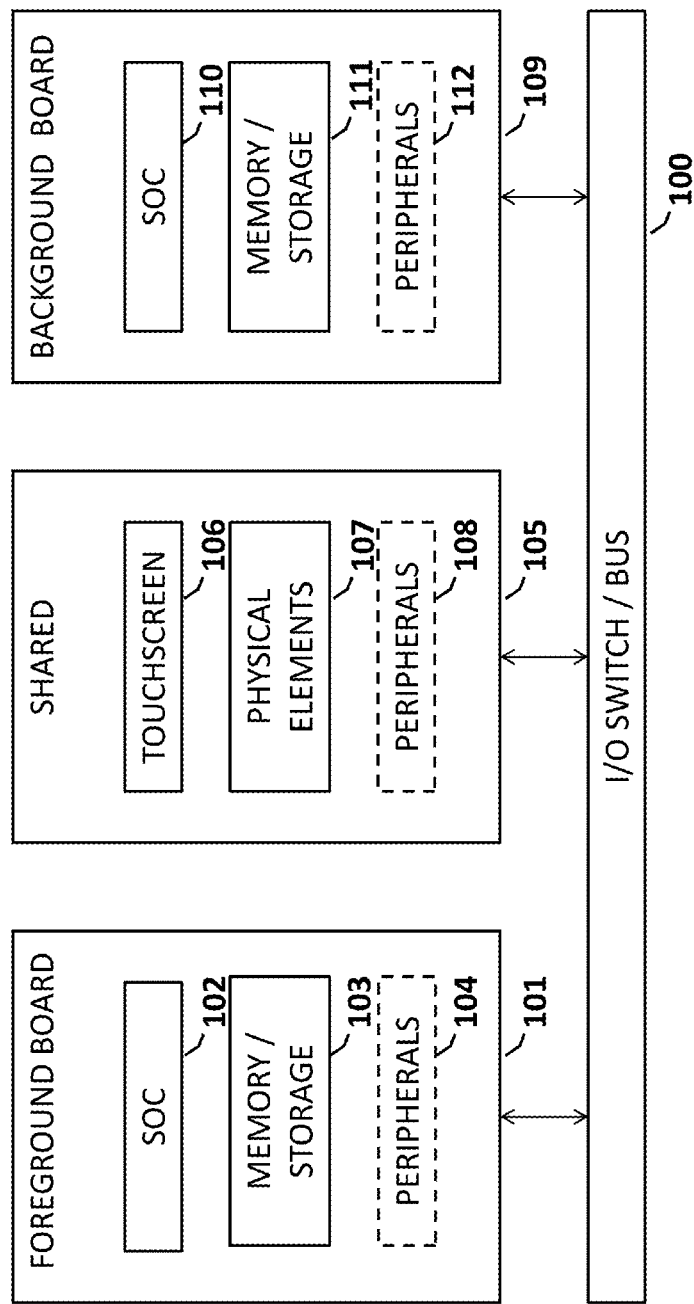
FIG. 1 depicts a high-level model of the invention.

FIG. 1 depicts a high-level model of the invention. Preferred embodiments of the present invention combine two separate Boards 101 and 109 in a single mobile computing system using I/O switch 100. Shared hardware 105 can be used by one of the Boards only, except the battery/power source (see FIG. 3, 303) which can be used by both Boards any time.

Each Board has its own SoC 102/110, Memory/Storage 103/111 and peripherals 104/112. Touchscreen 106, physical elements 107 (buttons and connectors) and other peripherals 108 are shared between Boards.

The microphone and speakers can be either dedicated (each Board has a pair of microphone/speakers) or shared.

Figure 2:
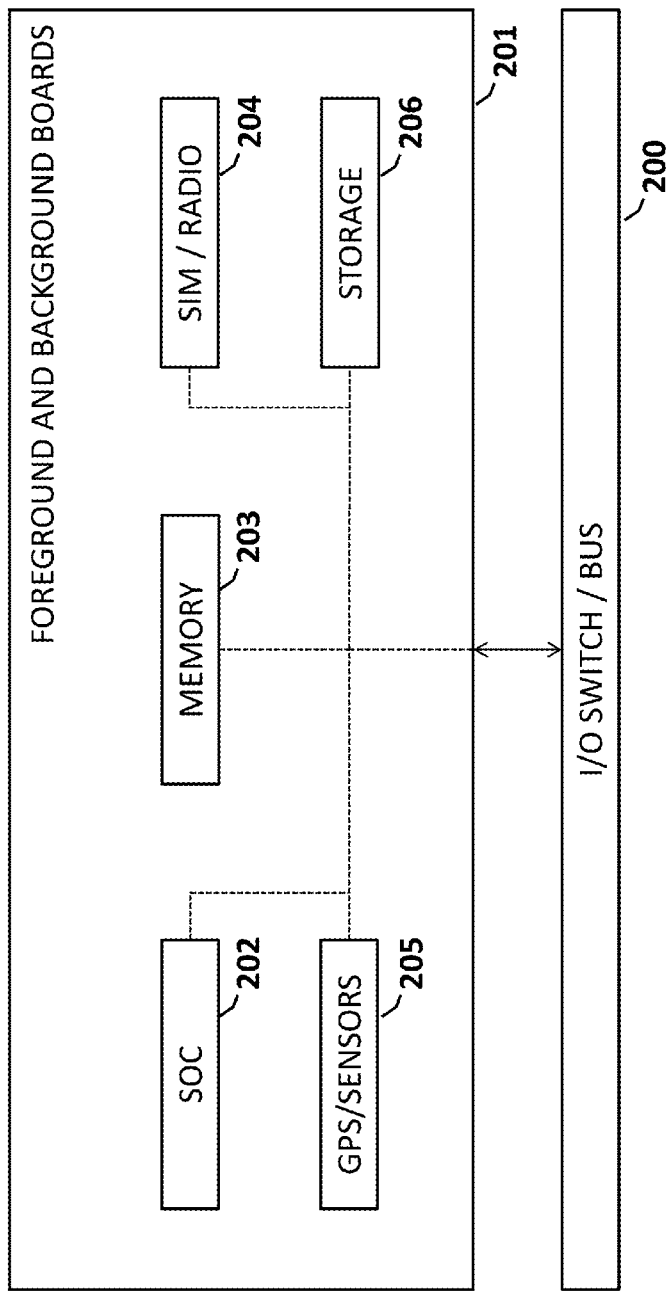
FIG. 2 presents a logical model of the main boards (i.e., the interchangeable Foreground and Background Boards.)

FIG. 2 presents a logical model of the main Boards. The Foreground and Background Boards 201 are connected to the I/O switch 200. Each Board has its own SoC 202, Memory 203, SIM/Radio 204, GPS/Sensors 205 and Storage 206. Each Board runs its own OS such as Android, iOS, Windows, etc. The OS's contain two additional software modules responsible for: (1) Board switch software—Foreground to Background and vice versa, depicted on FIGS. 6; and (2) notification exchange software between Boards depicted on FIGS. 7 and 8.

In the preferred embodiments of the present invention the OS on both Boards will be protected using digital signatures and full security capabilities of the hardware platform.

Figure 3:
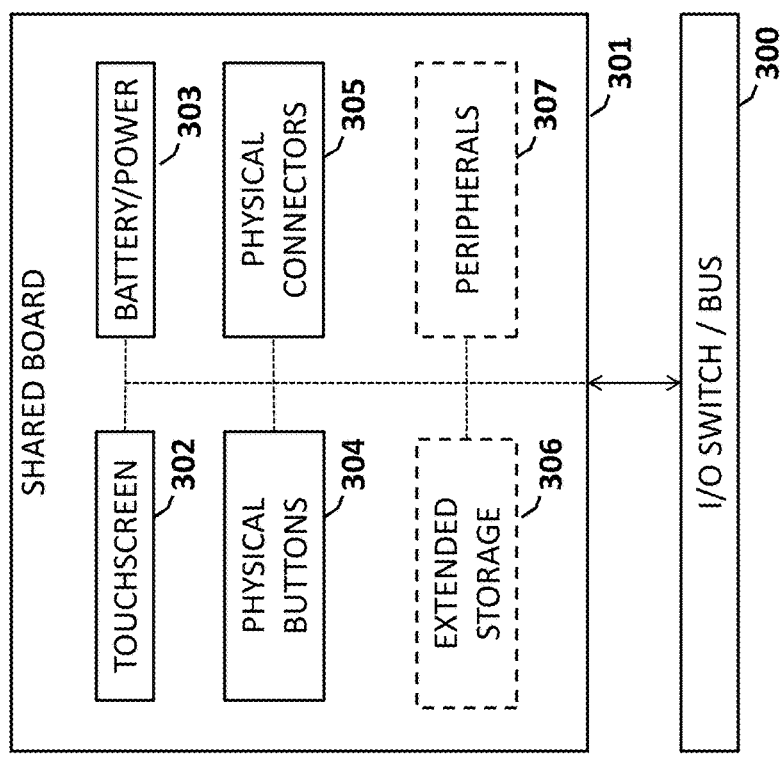
FIG. 3 illustrates a shared board logical model.

FIG. 3 illustrates a shared board ("Shared Board") logical model. The Shared Board 301 is connected to the I/O switch 300 and is comprised of the touchscreen 302, battery/power 303, physical buttons 304, physical connectors 305, optional extended storage 306 and peripherals 307.

Figure 4:
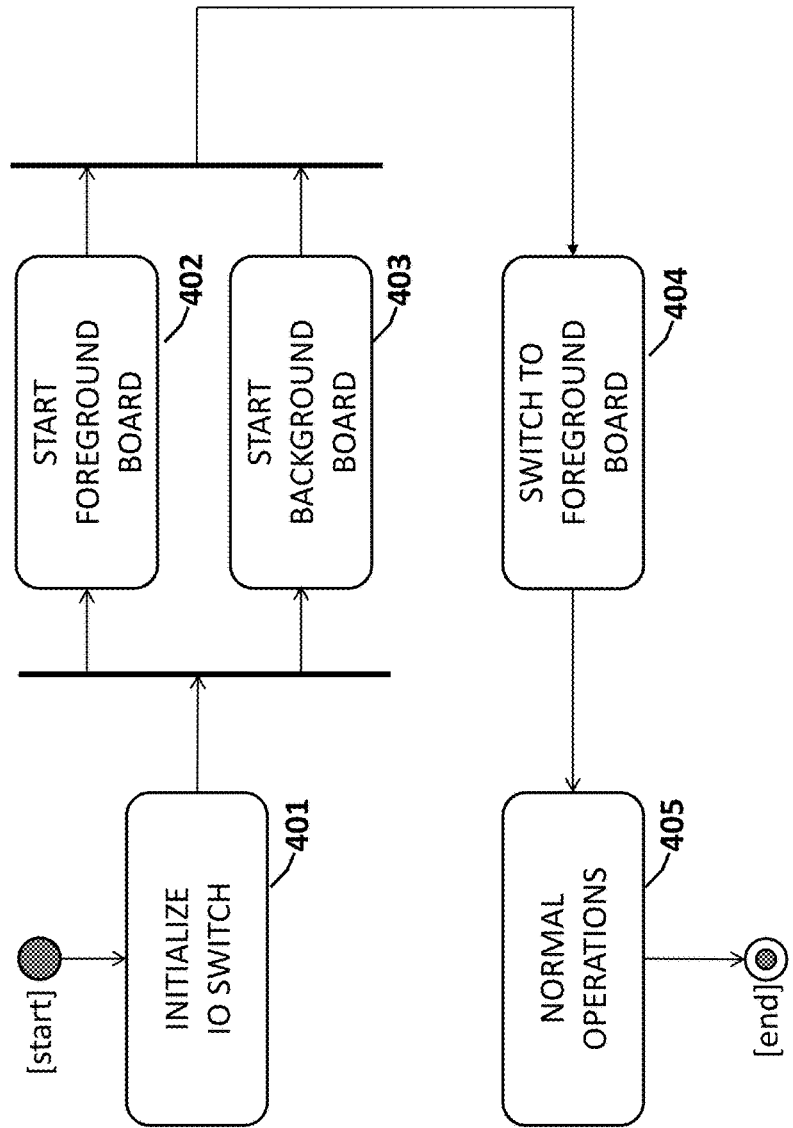
FIG. 4 depicts a parallel method of the start process.

FIG. 4 depicts a parallel method of the start process. First, the I/O switch 401 is started. Next, both Boards 402 and 403 start loading in parallel. The Foreground Board is started while connected to the shared hardware, and the Background Board uses emulated shared hardware.

Upon successful loading of both Boards, the I/O switch activates the Foreground Board 404. Next, normal operation of the device is started 405.

In the preferred embodiments of the present invention, the boot process on both Boards is protected using secure boot and creates a "chain of trust" to ensure the validity of the loaded software.

Figure 5:
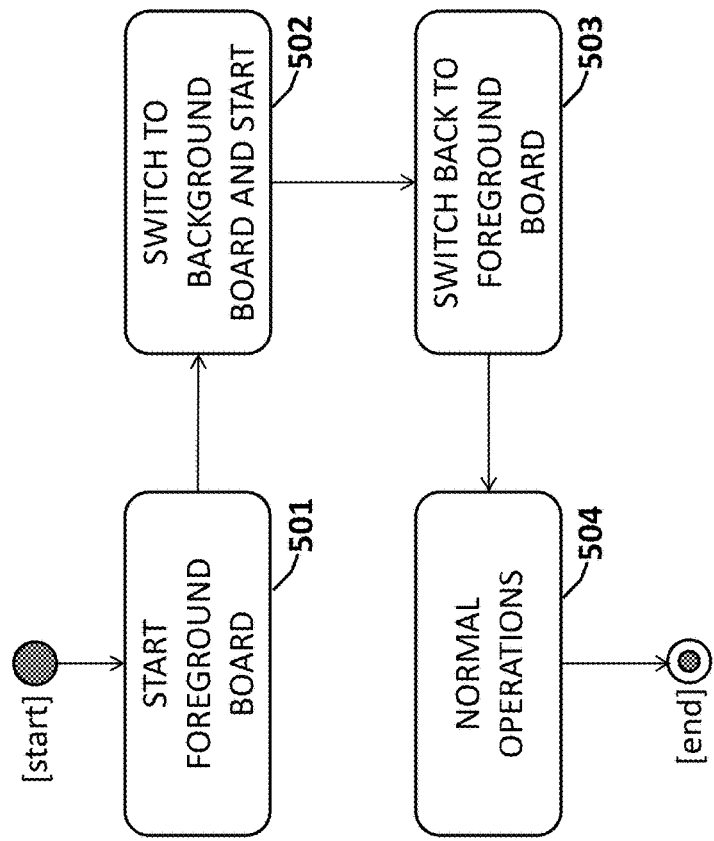
FIG. 5 presents a sequential method of the start process.

FIG. 5 presents a sequential method of the start process. First, the I/O switch starts the Foreground Board 501. Next, the I/O switch switches to the Background Board and starts it 502. Each Board uses a Shared Board's hardware while loading.

Upon successful loading of both Boards, the I/O switch activates the Foreground Board 503. Next, normal operation of the device is started 504.

The sequential boot process on both Boards is protected using a secure boot and creates a "chain of trust" to ensure the validity of the loaded software.

Figure 6:
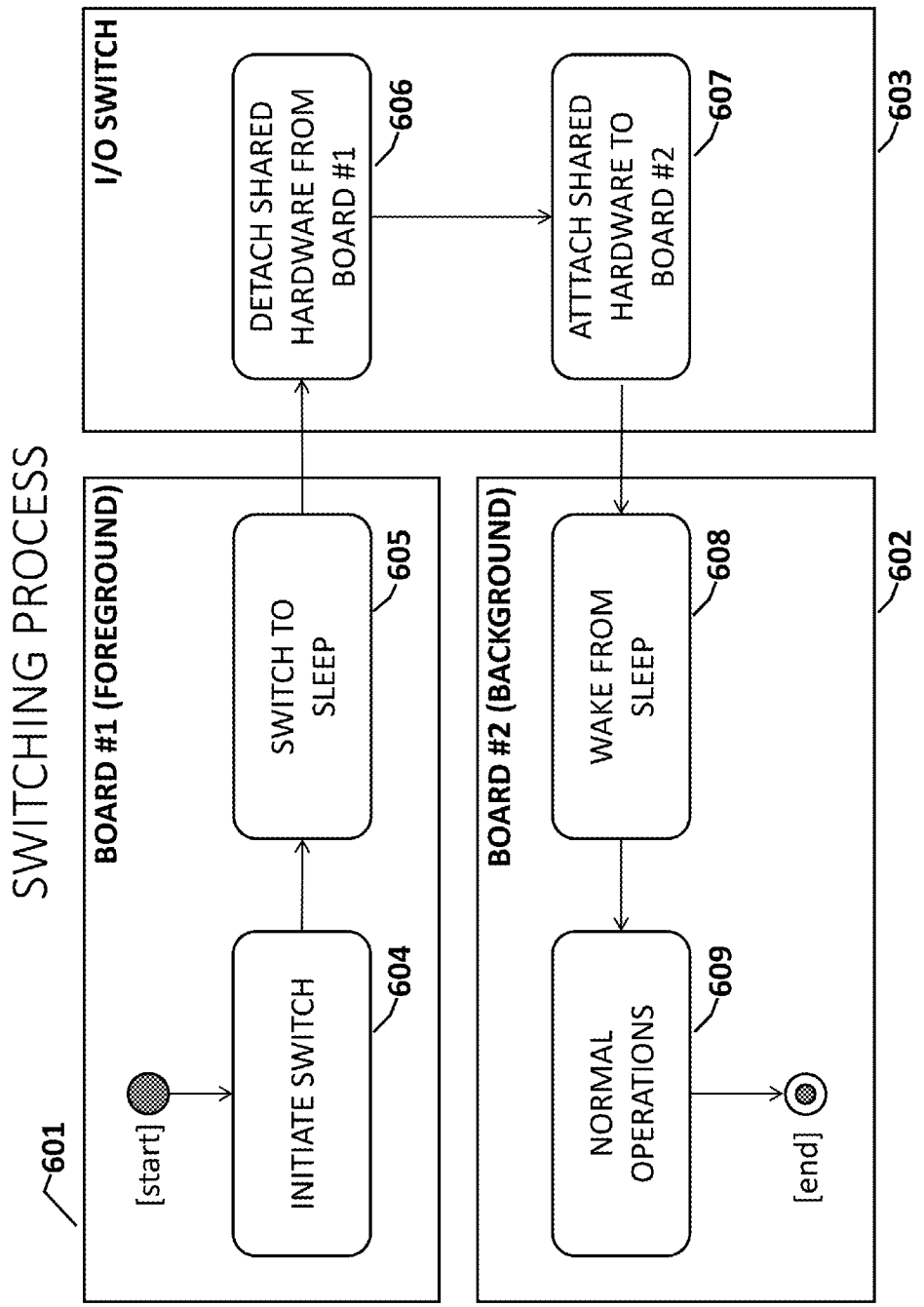
FIG. 6 illustrates a switching process.

FIG. 6 illustrates a switching process.

Switching between Foreground and Background Boards is initiated by user action only. To switch Boards the user may use a software method (an application in the Foreground Board) or a physical button connected to the I/O switch board. All methods initiate the same switching sequence described below.

A notification from the Background Board displayed on the Foreground Board may offer the user to switch Boards to handle the event. The scenario depicted on FIG. 11 (answering an incoming call in the Background Board) is an example of such approach.

First, a user initiates switching 604 in the Foreground Board 601. Next, the Board switches 605 to the sleep state. All pending operations with the shared hardware should be completed in the Foreground Board before the next step. It prevents possible conflicts and potential data leakage from the Board.

All hardware located on the Foreground Board is not affected by the switching process.

At the next step 605, the I/O switch 603 detaches shared hardware 606 from the Board #1. The Foreground Board 601 starts to use emulated shared hardware. Switching between real and emulated shared hardware is performed in I/O switch and is transparent to the Boards.

Using the approach described above, all switching between Boards in the present invention is performed instantly and does not involve any state backup/restore operations on Boards.

The only difference between Foreground and Background Boards is access to the shared hardware at any given time.

Next, the I/O switch 603 clears the hardware state, attaches shared hardware 607 to Board #2 and activates it.

The internal hardware state of the Boards is isolated from each other. To prevent data exchange between Boards, which therefore might cause cross-contamination from an infected one to a clean one, critically, the I/O switch does not allow data exchange between Boards unless it is explicitly allowed by the security settings. This allows user and enterprise IT administration flexibility in determining desirability of cross-Board communication, i.e., the invention contemplates that users will want to prevent cross-Board communication, but the invention does allow such communication if desired.

Now the Board 602 is ready to work with hardware. As a final step of the Board switching process, the Board 602 starts operating normally 609.

As is apparent to one having ordinary skill in the art, the process described above is completely different from the sleep/resume, hibernate/restore or hypervisor instant switch processes known in the prior art and is well suited for mobile devices where users typically expect instant access and switching between data and phone calls.

Figure 7:
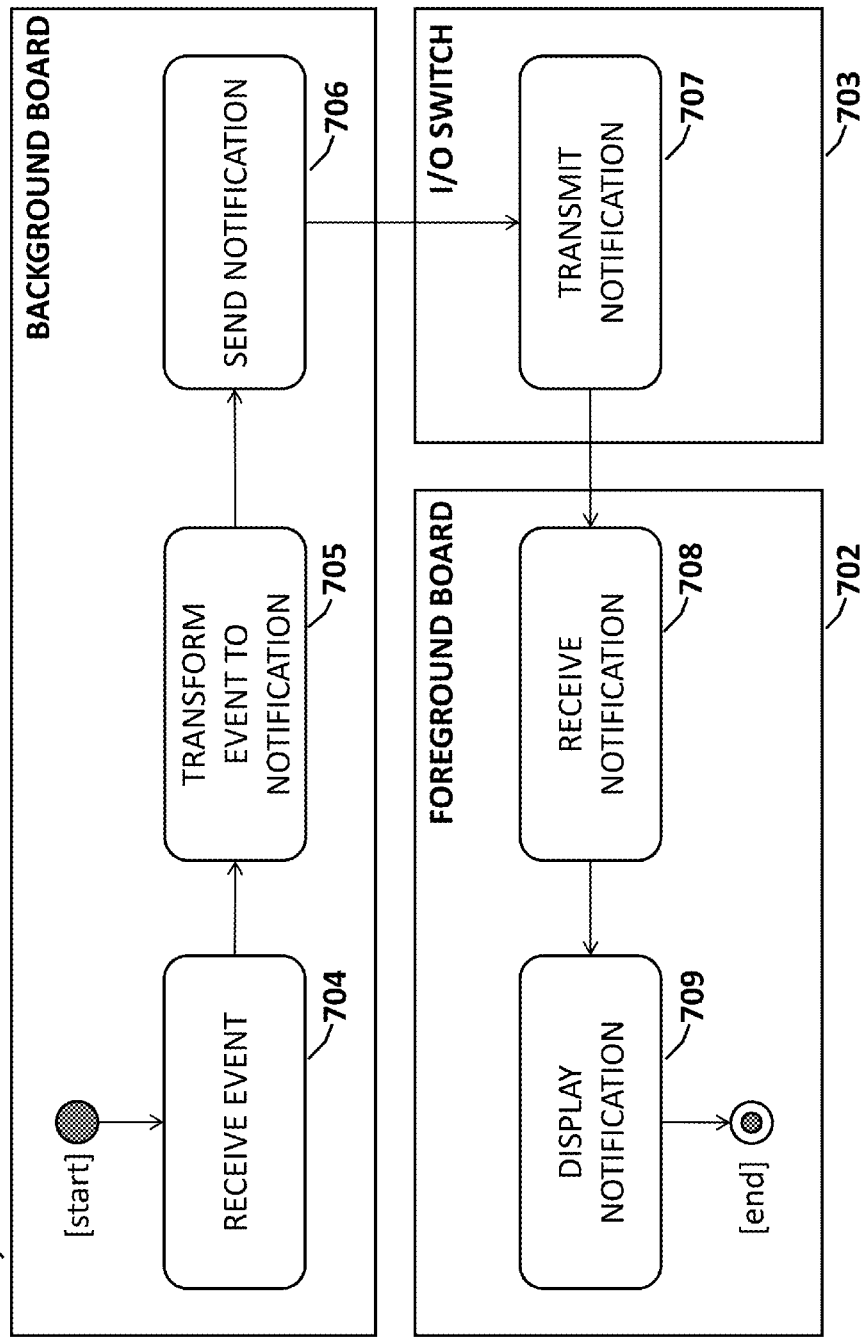
FIG. 7 depicts a notification process in wired mode.

FIG. 7 depicts a notification process in wired mode. Background Board 701 receives an event 704 during normal operations. Next, the event is transformed 705 into a notification.

With this process, for security purposes, there is no direct data exchange between Boards. Notifications are sent via I/O switch 703 which can perform an extensive independent validation, filtering and transformation of the notifications. To prevent data leakage, the original event's data is never sent to the Foreground Board directly. Depending on the security settings (policy), the Foreground Board can be notified that an event is detected in the Foreground Board without any details except as predetermined, e.g., "you have a new email", or other information as desired.

Both the Background Board and I/O switch can control the amount of information transmitted to the Foreground Board with the decision priority of I/O switch.

Upon successful transformation, the notification is delivered to the I/O switch 703. The I/O switch transmits 707 the notification to the Foreground board 702. The Foreground Board receives 708 and displays 709 the notification.

Figure 8:
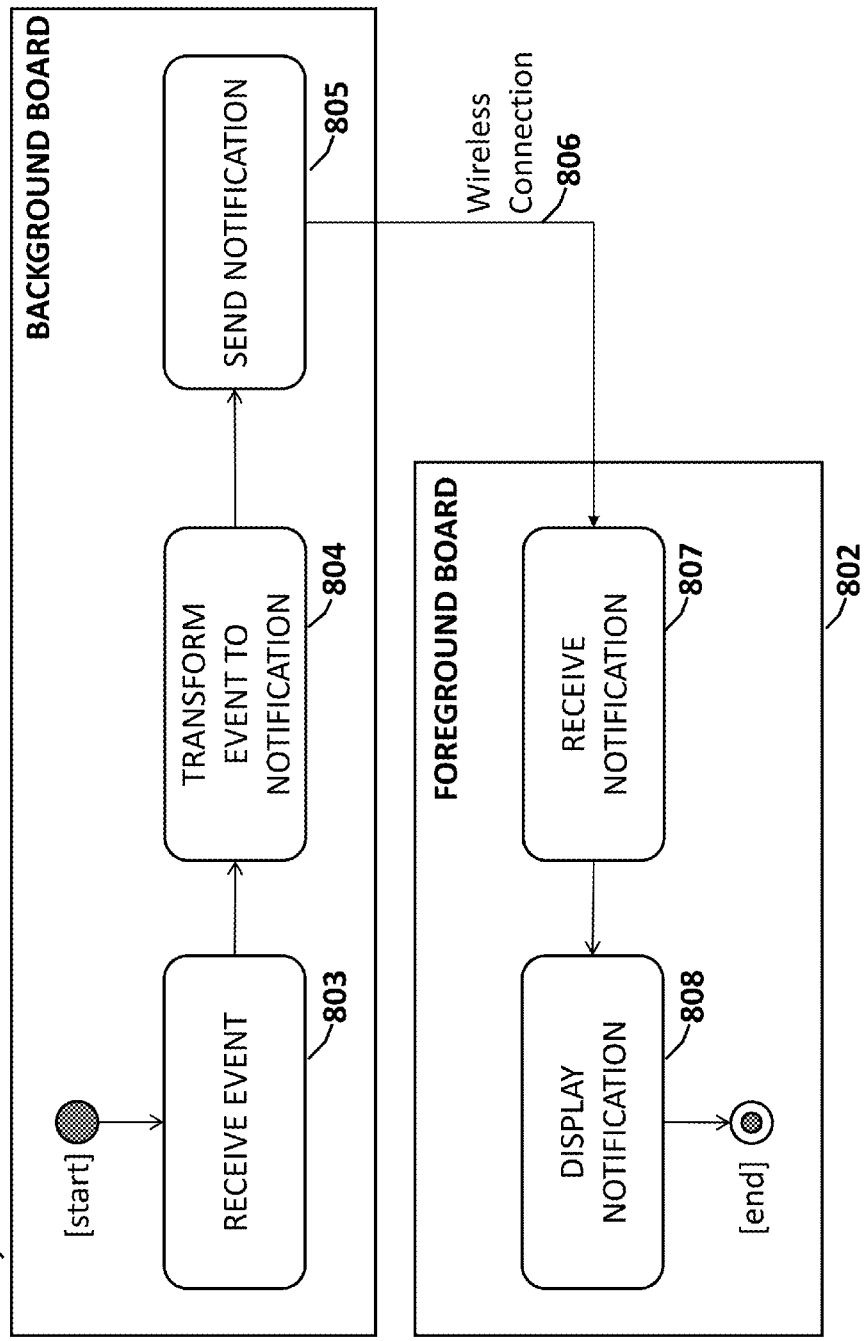
FIG. 8 presents a notification process in wireless mode.

FIG. 8 presents a notification process in wireless mode. Background Board 801 receives an event 803 during normal operations. Next, the event is transformed 804 to a notification.

In the wireless mode, direct notifications exchange between Boards is allowed by the security settings.

The I/O switch is not involved in the notifications delivery process in the wireless mode. Instead, the Background Board controls the amount of information transmitted to the Foreground Board.

Upon successful transformation, the notification is sent 805 to the Foreground Board 802. The Foreground Board receives 807 the notification and displays 808 it to a user.

Figure 9:
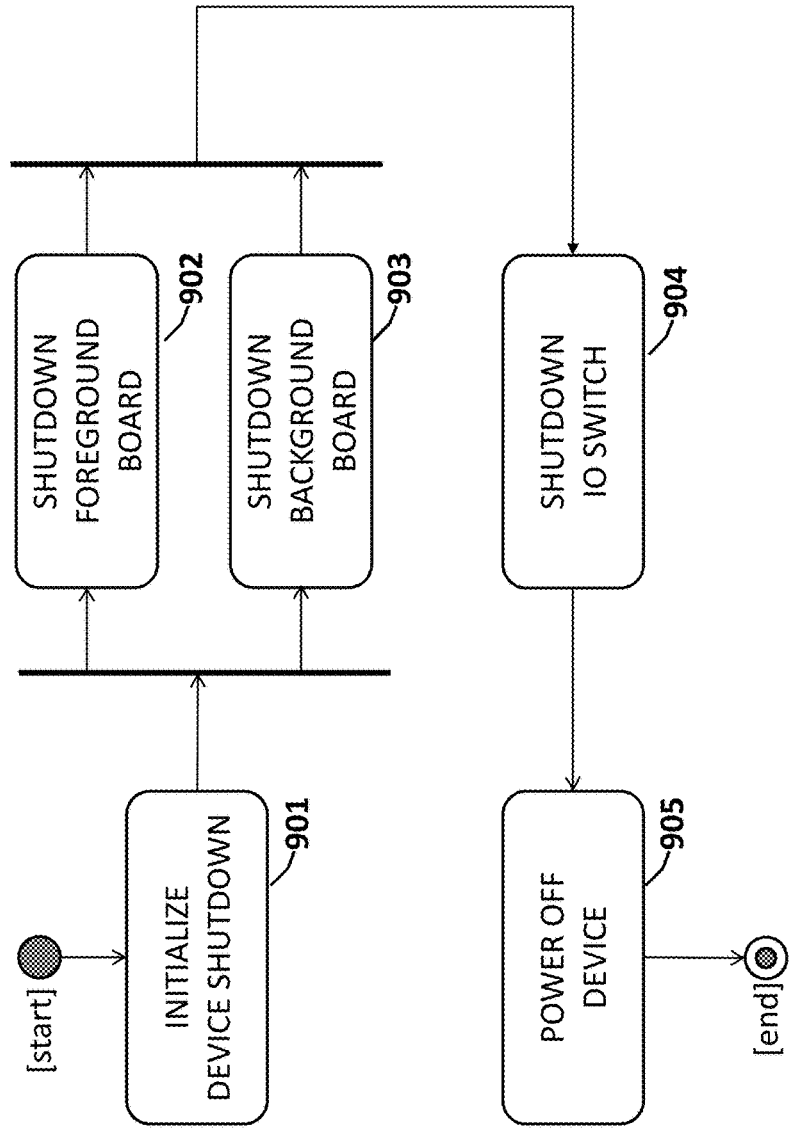
FIG. 9 illustrates a parallel method of the shutdown process.

FIG. 9 illustrates a parallel method of the shutdown process.

First, a normal sleep/shutdown process of the device is initialized 901. The shutdown process can be started in Foreground Board, or automatically by a system response to an event.

Both Boards perform shutdown 902 and 903 in parallel. The Foreground Board uses real shared hardware during the shutdown while Background Board uses emulated shared hardware only.

Upon successful shutdown of both Boards, the I/O switch shuts down 904. Next, the device is switched to the sleep mode or switched off 905.

Figure 10:
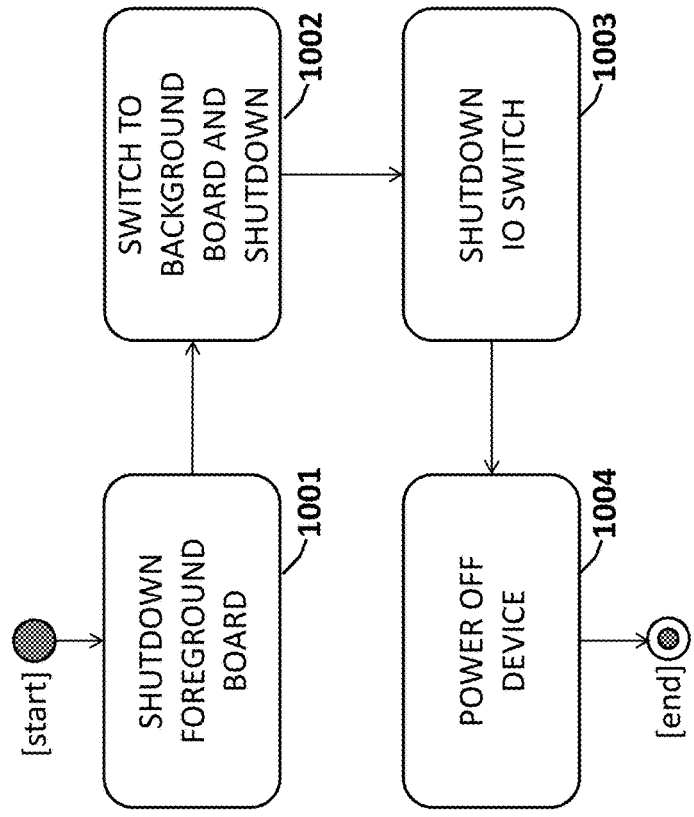
FIG. 10 depicts a sequential method of the shutdown process.

FIG. 10 depicts a sequential method of the shutdown process.

First, a normal sleep/shutdown process of the device is initialized 1001. The shutdown process can be started in the Foreground Board by a user, or can be a system response to an event. Next, the I/O switch switches to the Background Board and shuts down it 1002. Each Board uses real shared hardware while shutting down.

Upon successful shutdown of both Boards I/O switch shuts down 1003. Next, the device is switched to sleep mode or switched off 1004.

Figure 11:
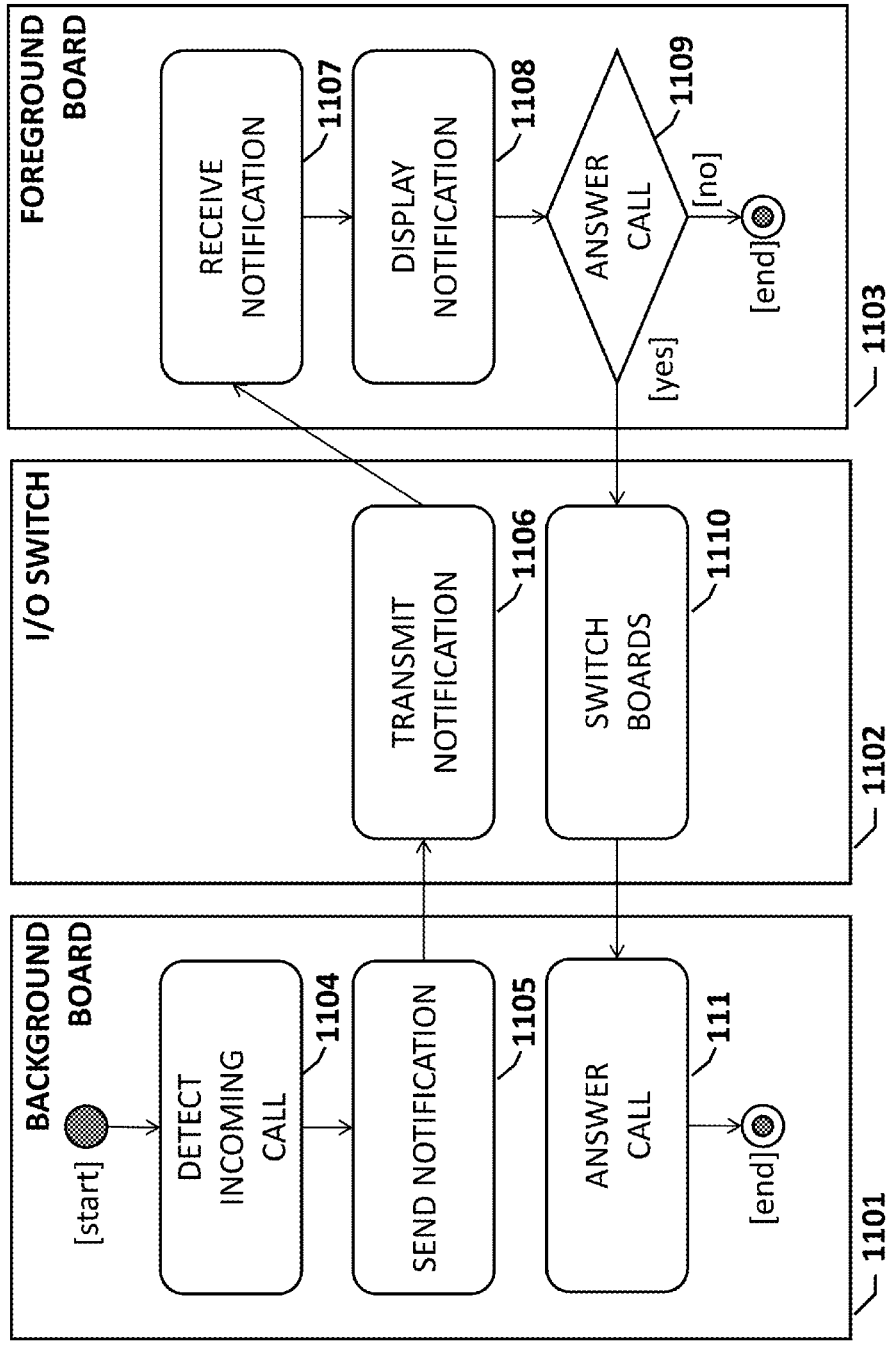
FIG. 11 presents a Background Board's incoming call processing.

FIG. 11 presents a Background Board's incoming call processing. First, an incoming call is detected 1104 in the Background Board 1101. Next, the Background Board sends 1105 a notification to the Foreground Board 1103 using I/O switch 1102 transport 1106.

The amount of information included in the notification depends on the security settings (policy).

Next, the Foreground Board receives 1107 the notification and displays 1108 it to a user. The user can either accept or reject the call 1109. If the user decides to reject the call, no additional steps are performed. Otherwise the control is passed to the I/O switch and it switches 1110 the Boards using the process and depicted on FIG. 6.

After switching to the Background Board, the user may answer the incoming call. Optionally, the incoming call can be automatically accepted after successful completion of the switching process.

I claim:

1. A mobile device computing system with two boards combined into a single device comprising:
   a. each board has its own System-on-a-Chip (SoC), Memory (RAM), Storage and Radio Module (SIM/Bluetooth/Wi-Fi);
   b. wherein each board runs its own operating system (OS);
   c. wherein touchscreen, physical buttons, other types of peripherals as selected, and power source are shared between boards;
   d. an I/O switch is used to connect the boards to the shared hardware;
   e. wherein the I/O switch provides isolation for the boards;
   f. wherein the shared hardware can be used by the first Board (Foreground Board) while the second Board (Background Board) uses emulated shared hardware;
   g. wherein the power source can be used by both Boards at the same time;
   h. wherein the Background Board detects new OS and applications events and notifies the I/O switch if any events are detected;
   i. wherein the I/O switch notifies the Foreground Board if any events are detected in the Background Board;
   j. wherein the Foreground Board notifies a user of the events detected in the Background Board;
   k. wherein only the user can initiate the Foreground Board switch to the Background Board;
   l. wherein during such switch the I/O switch sends a "switch to sleep mode" event to the Foreground Board and allows the Foreground operating system to handle this event;
   m. wherein during the switch all pending operations with the shared hardware are completed first before moving the Foreground Board to Background Board state;
   n. wherein during the switch, the I/O switch disconnects the suspending Foreground Board from the shared hardware;
   o. wherein during the switch, the shared hardware state is cleared before switching to the Background Board; and
   p. wherein during the switch, the I/O switch disconnects the shared hardware from the suspending Foreground Board and connects it to the Background Board.

2. The mobile device computing system as claimed in claim 1 wherein the Foreground Board can receive a notification about an incoming call in the Background Board, initiate a Board switch and allow a user to answer the call in the Background Board.

3. The mobile device computing system as claimed in claim 1 wherein the Boards can use a shared extended storage partitioned and managed by the I/O switch.

4. The mobile device computing system as claimed in claim 1 wherein the I/O switch, during the device start, initiates parallel start of the operating systems on all Boards and activates one of the boards upon completion.

5. The mobile device computing system as claimed in claim 1 wherein the I/O switch, during the device start, initiates sequential start of the operating systems on all boards and activates one of the boards upon completion.

6. The mobile device computing system as claimed in claim 1 wherein the I/O switch, during the device shutdown, initiates parallel shutdown of the operating systems on all Boards and shuts off the device upon completion.

7. The mobile device computing system as claimed in claim 1 wherein the I/O switch, during the device shutdown, initiates sequential shutdown of the operating systems in all Boards and shuts off the device upon completion.

8. The mobile device computing system as claimed in claim 1 wherein the Background Board can use a shared hardware if this access is exclusive and the Foreground Board does not use the same shared hardware.

9. The mobile device computing system as claimed in claim 1 wherein the switch between Foreground Board and Background Board can be initiated not only by the user's action, but by a specific system event as well.

10. The mobile device computing system as claimed in claim 1 wherein the switch between Foreground and Background Boards can be prevented based on the location, device state, security policy, authenticated user or similar variable.

11. The mobile device computing system as claimed in claim 1 wherein Boards are not fully isolated from each other, and limited and controlled communication between Boards is allowed.

12. The mobile device computing system as claimed in claim 1 wherein the system is a smartphone, tablet, phablet, IoT device, communication device, wearable device or any device that can communicate wirelessly.

13. The mobile device computing system as claimed in claim 1 wherein both Boards and the I/O switch can be implemented on a single printed circuit board.

* * * * *